United States Patent Office 3,334,839
Patented Aug. 8, 1967

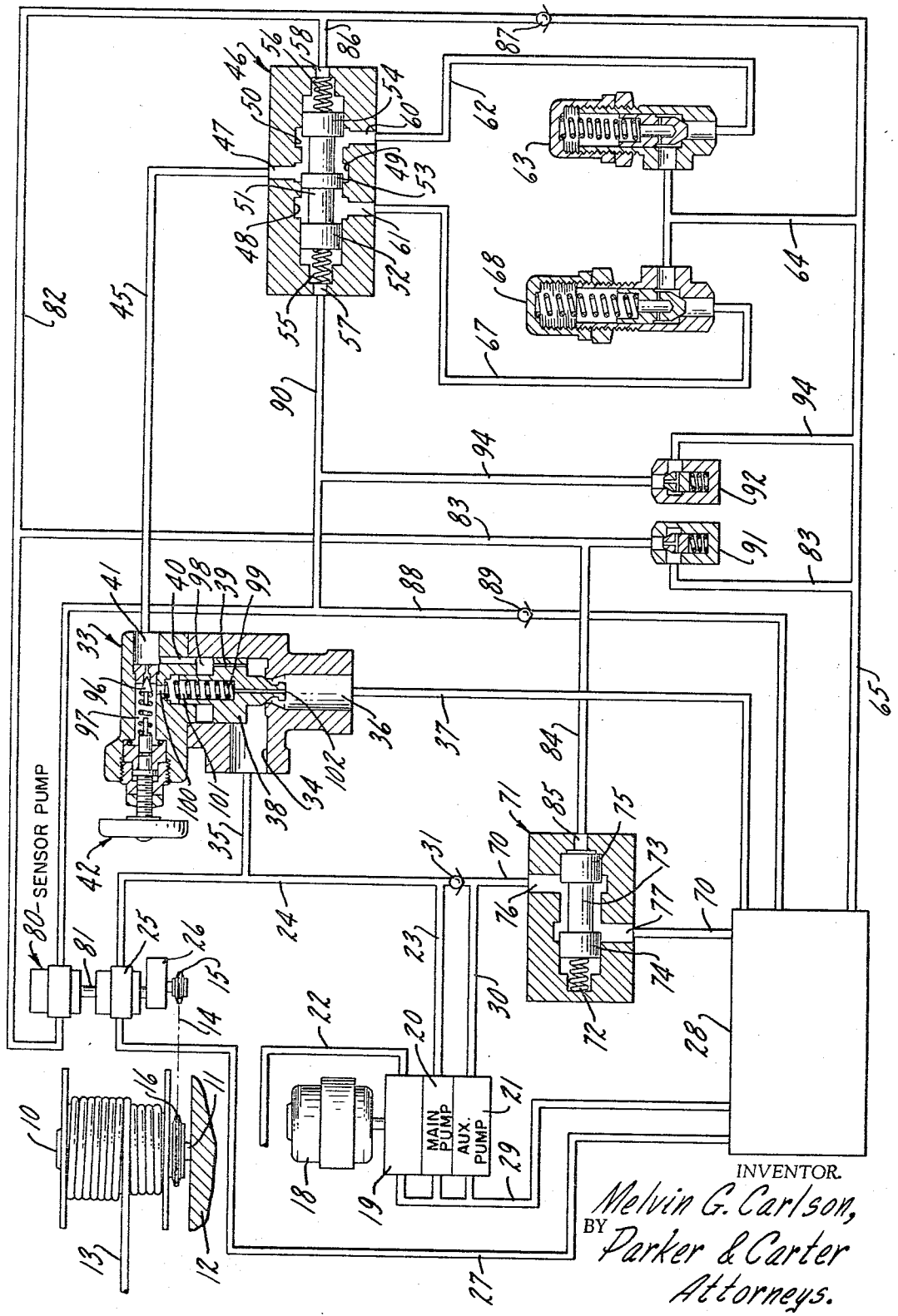

3,334,839
CABLE REEL TENSION SYSTEM
Melvin G. Carlson, Oak Lawn, Ill., assignor to Westinghouse Air Brake Company, Pittsburgh, Pa., a corporation of Pennsylvania
Filed Oct. 22, 1965, Ser. No. 502,232
7 Claims. (Cl. 242—86.51)

This invention relates to a hydraulic system for maintaining a substantially uniform force application to a flexible member controlled by the system under varying load conditions. Specifically it relates to a hydraulic circuit for maintaining the tension on a cable carried by a cable reel substantially constant during conditions of wind, unwind, at rest, and at change over intervals from one condition to another.

The invention will be described as applied to a cable reel carried by a shuttle car of the type used in underground coal mining. This specific use is illustrative only however because the invention is applicable to other environments in which the above mentioned operating conditions are present.

Cable reels are designed to store trailing electrical cables and should provide a generally uniform tension on the cable when either winding or unwinding. Even when a car is standing still cable tension must be maintained so there will be no time lag in reeling up the cable when the shuttle car begins to move in a reel winding direction because a slack cable would be damaged or fouled if the car runs over it.

When a shuttle car moves in a direction to wind cable the movement itself has a diminishing effect on the cable tension. Therefore a relatively high hydraulic pressure is required in the circuit just to provide a moderate tension on the cable at this time. When the shuttle car moves in a direction to unwind tension is imparted to the cable due to the weight and inertia of the reel and back driving the mechanical components as well as the pressure in the hydraulic circuit. Therefore a comparatively low pressure is needed at this time to provide a tension on the cable approximately equal to the tension that exists during winding.

Accordingly a primary object of the invention is to provide a hydraulic system for a cable reel which maintains a tension within a predetermined limit on the cable at all times.

Another object is to provide a hydraulic circuit for a shuttle car cable reel which provides generally uniform tension on the cable during winding and unwinding, and a suitable tension on the cable when standing still.

Another object is to provide a hydraulic circuit for a shuttle car cable reel in which the temporary cable tension increases which may be experienced upon changing from a stationary to an unwind condition is maintained below a point at which the cable will be damaged.

A further object is to provide a system as above described which has the further ability to quickly impose, starting from a stationary condition, increased or decreased tension on the cable depending upon whether the cable is to be wound or unwound.

Yet another object is to provide a hydraulic circuit for a shuttle car cable reel having three operating pressures, one for each of the three operating conditions of wind, unwind, and at rest, and means for quickly establishing the appropriate pressure to maintain a proper tension on the cable at all times.

Other objects and advantages of the invention will be apparent from a reading of the following description.

The invention is illustrated more or less diagrammatically in the accompanying figure in which the components of the system have been shown generally schematically. For a further understanding of the background and environment in which the present invention may be advantageously employed reference is made to Patent 3,250,492 assigned to the assignee of this application.

A cable reel 10 carried by shaft 11 is shown mounted on shuttle car 12 or some other appropriate carrying structure. A cable, the maintenance of tension of which is the subject of this invention, is indicated at 13. The reel 10 is wound, unwound, or maintained stationary by any suitable mechanical drive system here shown as a chain 14 which travels about a drive sprocket 15 and a reel sprocket 16. The latter is carried by and rotates with cable reel 10. Rotation of drive sprocket 15 is controlled by the hydraulic system which will next be described.

A motor is indicated at 18. The motor drives three pumps 19, 20 and 21 respectively from a common shaft. Pump 19 opens into an output line 22 which performs other functions on the shuttle car or other associated mechanism, an understanding of which is not essential to an understanding of this invention.

Pump 20 is of relatively small volumetric capacity and is connected by line 23 to motor line 24. A hydraulic motor is indicated at 25, the motor driving drive sprocket 15 through a gear box 26. The other side of the motor is connected by line 27 to tank 28. Pump 20 is also connected to tank 28 by line 29.

Pump 21, which may be of a greater volumetric capacity than pump 20, is connected by line 30 to motor line 24. A one way check valve is indicated at 31.

A high pressure relief valve is indicated generally at 33. The relief valve includes an inlet port 34 connected into line 24 by branch line 35, and an outlet port 36 connected to the tank by line 37. Preferably valve 33 is a high pressure, balanced spool type valve which is set to relieve at the highest pressure in the system. It will be noted that the valve spool 38 is movable from its illustrated position upwardly to a position in which outlet port 36 is connected directly to the inlet port 34. A first vent or bleed line is indicated at 39 in the spool body. A second, somewhat larger vent is indicated at 40, this vent terminating in a high pressure relief port 41, the pressure within which is regulated by the pressure adjusting mechanism 42.

Port 41 is connected by line 45 to a pilot operated, spring centered, three position shuttle valve 46. Line 45 opens into port 47 which in turn opens into the middle chamber of three internal chambers 48, 49 and 50. The spool 51 includes three lands 52, 53 and 54. A pair of springs 55, 56 are bottomed over end ports 57, 58 respectively and maintain the spool in the illustrated position when the cable reel 10 is at rest as will be explained in detail hereinafter.

An intermediate pressure port is indicated at 60 and a low pressure port at 61. The intermediate pressure port is connected by line 62 to intermediate pressure control valve 63. This valve has an adjustable pressure setting. During operation the pressure setting is intermediate the high and low pressures of the other two operating pressure valves of the circuit. Valve 63 is connected by line 64 to tank line 65.

Low pressure port 61 is connected by line 67 to a low pressure relief valve 68 which is also connected to tank 28 by lines 64 and 65. Valve 68 is also preferably an adjustable pressure valve with the pressure being set to the lowest of the three operating pressures in the system.

Pump 21 may also be placed in communication with tank 28 through a line 70 within which is located a two position, spring-biased pilot operated shuttle valve 71. A spring 72 maintains the spool 73 in the illustrated position when cable reel 10 is unwinding or at rest. In these conditions the lands 74 and 75 permit free flow between inlet port 76 and outlet port 77.

A reel direction sensor is indicated at 80. Sensor 80 is preferably a pump driven from the shaft 81 of motor 25. A pilot pressure signal line 82 leads from one side of the pump. Line 82 is connected by branch lines 83 and 84 to a pressure signal port 85 in valve 71. Line 82 is also connected by a branch line 86 to port 58 of control valve 46. A check valve is indicated at 87.

The other side of sensor 80 is connected by line 88 to tank 28, line 88 containing check valve 89 therein. A branch line 90 extends from intake line 88 to port 57 of control valve 46.

A pair of pilot pressure valves are indicated at 91 and 92. Valve 91 is in line 83 and valve 92 is in branch line 94. These valves do not regulate any one of the three working pressures in the system. Their primary purpose is to provide a pilot pressure as will be described hereinafter.

The use and operation of the invention is as follows.

Hydraulic motor 25 drives the cable reel 10 on which the cable 13 is wound, unwound or maintained stationary. The sensor pump 80 which is mounted on the common shaft 81 pumps hydraulic fluid whenever motor 25 is turning. Sensor pump 80 is the reel direction sensor means which supplies fluid under pressure to operate the shuttle valves 46 and 71 which in turn regulate the pressure and volume in the circuit.

In prior hydraulic systems, such as that system described in Patent 3,250,492, the sensor pump 80 does not supply operating pressure immediately when a change in system conditions is called for. That is, assuming the reel 10 is at rest and the operator drives the shuttle car in a direction to cause the reel 10 to wind the cable 14, a few rotations of the pump 80 would be necessary to develop the pressure in the system to the high level required by winding. If low pressure existed in the system just prior to winding, the time lag which occurred until the necessary high pressure was established would cause the cable to go slack. If slack occurs there is danger of the car running over the cable. Therefore prior systems have been so designed that the high pressure valve is in operation when winding or when standing.

Now, when unwinding is begun in such prior systems the electrical cable will start to unspool with the circuit still at the high pressure. This will tension the cable well above the desired limit and may cause damage to the cable, either by repeated stretchings which cause weakness or actually by pulling the cable apart.

The present invention overcomes the above mentioned difficulties and yet retains all the advantages of the prior basic high and low pressure systems. This invention provides an intermediate pressure setting which is established whenever the reel is at rest or, in other words whenever the shuttle car is stationary. The instant the car starts to move in a direction to take up cable the intermediate pressure will cause the reel to rotate with enough power and responsiveness to prevent the cable from going slack and being run over by the car. This intermediate pressure will remain in effect until high pressure control can be established. That is, the intermediate pressure tensions the cable satisfactorily in the short interval of time commencing with initiation of movement of the shuttle car, and terminating with the establishment of high pressure. The intermediate pressure could not however indefinitely provide the power needed to keep the cable taut when the car moves at a normal operating speed in a reel winding direction.

Another great advantage of this invention becomes evident when the shuttle car moves from a stationary position in a direction to unspool or unreel the cable. Here again there is a short time interval when the reel is operating at the intermediate pressure until sensor pump 80 can produce a working pressure sufficient to establish the low pressure range in the circuit. During this time the tension on the cable will increase somewhat but the tension will remain well below the point where any damage could result since the starting tension was determined by a pressure which is well below the maximum operating pressure.

When the shuttle car stops the intermediate pressure will immediately be re-established to provide sufficient tension to tighten up the cable preparatory to movement of the car later in a direction to wind the cable.

A specific description of the above described circuits is as follows.

Let it be assumed, solely for purposes of illustration, that pump 20 has a capacity of approximately three gallons per minute and pump 21 a capacity of approximately nine gallons per minute. Further, it may be assumed that the high pressure relief valve 33 is set to 450 p.s.i., the intermediate pressure valve 63 at 250 p.s.i., the low pressure valve 68 at 150 p.s.i., and the vent valves 91, 92 at 65 p.s.i. It will be understood however that these values are exemplary only.

Assume first that the shuttle car is stationary.

When the shuttle car is stationary, sensor pump 80 is also stationary. As a result there is no fluid flow in the pressure signal circuit which includes sensor 80, line 82, line 65, tank 28, line 88 and line 83. As a result spool 51 of the control valve 46 will be maintained in the illustrated position by springs 55, 56. In this position low pressure port 61 is blocked by land 53 and intermediate pressure port 60 is open through chamber 49 to inlet port 47. The intermediate pressure valve 63 is therefore in communication with the port 41 of high pressure relief valve 33. Spool 73 of shuttle valve 71 will likewise be in the illustrated position because spring 72 will hold the spool in the illustrated position against the negligible pressure in line 84. In this condition, then, the fluid pumped by pump 21 will merely circuit through pump 21, line 30, line 70, valve 71, tank 28 and line 29 back to the pump.

The operating pressure in the system will be the operating pressure of the intermediate pressure valve 63, which in this instance is 250 p.s.i. That is, the output pressure of pump 20 will be transmitted to port 41 of high pressure relief valve 33 via lines 23, 24, 35, port 34, vents 39 and 40. Since pressure adjusting means 42 is set at 450 p.s.i., the needle valve 96 will remain in its illustrated, seated position. The pressure setting in valve 63, so long as it is below 450 p.s.i., will therefore determine the working pressure in the system.

Now assume the operator moves the shuttle car in a reel winding direction which therefore requires increased pressure in the system in order to maintain the tension on cable 13 sufficiently great to prevent the cable from going slack and being run over by the shuttle car.

Rotation of motor 25 in a direction corresponding to the winding of reel 10 causes sensor pump 80 to turn over. Assuming line 82 is the pilot pressure output line the following will happen.

The pressure in line 82 will increase. This increased pressure will be transmitted via lines 83, 84 to the pilot operated shuttle valve 71. Valve spool 73 will be moved to the left against the resistance of spring 72 to a position in which land 75 blocks in inlet port 76. Communication between pump 21 and tank 28 through valve 71 is thereby blocked. The output of pump 21 is thereby directed into line 24 through check valve 31.

The increased pressure in line 82 will also be transmitted by branch line 86 to the control valve 46. Spool 51 will be moved to the left to a position in which land 54 blocks communication between inlet port 47 and intermediate pressure port 60. At the same time land 53 will continue to block communication between inlet port 47 and low pressure port 61. Spring 55 presents no obstruction to the movement of spool 51 because line 90 is connected into the intake pressure side 88 of sensor pump 80.

With valve 46 in this blocking condition the operating pressure in the circuit will determined by high pressure relief valve 33 since intermediate and low pressure valves 63 and 68 have been effectively removed from a controlling function. The operation of the high pressure circuit will be as follows.

The pressure beneath valve spool 38, which is derived from the combined output of pumps 20 and 21, will immediately be transmitted through vents 39 and 40 to port 41 since the lines 35, 45 and high pressure valve 33 are full of pressure fluid at this time. As soon as the pressure in port 41 exceeds 450 p.s.i., valve 96 will be unseated and fluid will pass into chamber 97.

The pressure in port 41 and in chamber 98 above spool 38 will immediately fall below 450 p.s.i., when this occurs the following two movements will quickly occur.

Firstly, spool 38 will rise since vent or restriction 39 is too small to permit fluid to flow upwardly fast enough to equalize pressure above and below the spool.

Secondly, valve 96 will be reseated.

When spool 38 is unseated, fluid will flow directly from port 34 to 36. When this occurs the pressure beneath spool 38 drops to a valve below the pressure in chamber 98. The pressure differential and spring 99 will then force spool 38 downwardly back to its illustrated position. Any fluid in chamber 97 will pass into line 37 through aperture 100, spring chamber 101, and drain line 102.

The valve 33 is then in readiness for a succeeding pressure buildup in port 41 followed by an unseating and seating movement of spool 38.

Now assume the operator has stopped the shuttle car. Upon cessation of car movement sensor pump 80 stops rotating and the pressure signal in lines 82 and 83 decays. The decay of the pressure signal in branch line 86 enables spool 51 to move back to the illustrated position at which time intermediate pressure valve 63 controls the operating pressure in the system. The decay of the pressure signal in line 84 will similarly cause spool 73 to move to the illustrated position and output of pump 21 will be diverted back to tank rather than through line 24 as was the case during high pressure operation.

Now assume the operator moves the shuttle car in a reel unwind direction.

When this occurs, the directional rotation of sensor pump 80 is opposite to that which occured during high pressure operation, and line 88 becomes the pilot pressure line and line 82 the intake pressure line. Spool 51 of control valve 46 is thereby moved to the right from the illustrated position by means of the pilot pressure signal acting on the spool through line 90. Land 53 is moved to the right a distance sufficient to block communication between port 47 and intermediate pressure port 60, and open communication between port 47 and the low pressure port 61. Since little or no back pressure exists in branch lines 83 and 84, the spool 73 of the control valve 71 will remain in the illustrated condition and the output of pump 21 will not be added to the circuit. The pressure in the system at this time then is controlled by the pressure setting of low pressure valve 68.

Vent valves 91 and 92 provides suitable back pressures for the pressure signals emanating from sensor pump 80. At the cessation of operating pressures derivable from pump 80, pressure fluid bleeds through the inverted T-shaped openings in the valve members in valves 91 and 92 thereby allowing the pressure and volume in lines 83 and 94 to return to minimum pressure conditions. This in turn allows spring 72 and either 55 or 56 to return the spools 73 and 51 to their illustrated positions. Check valves 89 and 87 enable fluid from the tank to enter the system.

The high pressure relief valve 33 is the only valve having a capacity able to discharge the maximum flow of hydraulic fluid to the tank 28. The low and intermediate pressure relief valves 68 and 63 respectively are of a minimum size and serve only to alter the pressure setting at which the high pressure relief valve will relieve to tank. These features provide another advantage of this system which resides in the use of two pumps to drive the cable reel. The small volume pump 20 is constantly supplying hydraulic fluid under pressure to the system for holding the cable tension when the shuttle car is standing and also to provide the back pressure to the reel motor when the cable is unspooled.

When winding, pump 20 also delivers its output to the reel motor 25, but at this time its output is insufficient, by itself, to create the necessary tension on the cable. At this time the second, and preferably larger volume, booster pump 21 is added to the circuit leading to reel motor 25. This pump, in combination with pump 20, supplies the added volume needed to maintain the necessary tension when winding the cable at operating speeds. When the added volume of pump 21 is not needed, valve 71 diverts the output of pump 21 to tank at virtually no back pressure. This therefore eliminates much of the usual heating of the oil common with prior circuits which employ only one pump.

Although a preferred embodiment of the invention has been illustrated and described it will be understood that the above mentioned values should be understood in a relative, and not an absolute, sense, and that the specific description is exemplary only. It is intended that the scope of the invention be limited, not by the foregoing description, but solely by the scope of the hereinafter appended claims.

I claim:

1. In a fluid pressure system for controlling the tension on a flexible member wound on and extending from a reel during the three operating conditions of unwind, at rest, and wind,
   means for automatically establishing a minimum, intermediate, and maximum fluid pressure in said system, with
   said minimum pressure being effective when the reel is unwound, said intermediate pressure being effective when the reel is stationary, and said maximum pressure being effective when the reel is found.

2. The fluid pressure system of claim 1 further characterized in that said means includes
   a pressure source,
   a reel motor in circuit with the pressure source and in driving association with the reel,
   a low pressure circuit having a low pressure valve therein,
   an intermediate pressure circuit having an intermediate pressure valve therein,
   a high pressure circuit having a high pressure relief valve therein, and
   reel direction sensing means effective to initiate connection of the pressure source to the reel motor by the low, high, or intermediate pressure circuits upon establishment of unwind, wind, or stationary conditions, respectively, of the reel.

3. The fluid pressure system of claim 2 further including
   control valve means associated with the low, intermediate, and high pressure circuits which, upon reception of a signal from the reel direction sensing means, connects the pressure source to the appropriate pressure circuit.

4. The fluid pressure system of claim 3 further characterized in that the pressure source includes
   a first pump in the low and intermediate pressure circuits which is the sole source of pressure in the low and intermediate pressure circuits, and
   a second pump which, together with the first pump, is the source of pressure in the high pressure circuit.

5. The fluid pressure system of claim 3 further characterized in that the reel direction sensing means is a sensor pump, the existence and direction of rotation of which bears a fixed relation to the existence and direction of rotation of the reel, said sensor pump and its associated circuitry functioning to generate and transmit signals to the control valve means for establishing the low, intermediate and high operating pressure circuits, said low, intermediate and high pressure operating circuits corresponding, respectively, to unwind, stationary, and wind conditions of the reel.

6. The fluid pressure system of claim 5 further characterized in that the sensor pump is driven by the reel motor.

7. The fluid pressure system of claim 4 further characterized in that the second pump normally circulates to tank via a tank circuit during operation of the low and intermediate pressure circuits, and further including valve means in the tank circuit for shutting off said tank circuit during high pressure circuit operation in response to a signal from the sensor pump.

References Cited

UNITED STATES PATENTS

| | | | |
|---|---|---|---|
| 2,395,302 | 2/1946 | Slomer | 242—86.51 |
| 3,250,492 | 5/1966 | Hlinsky et al. | 242—86.51 |

FRANK J. COHEN, *Primary Examiner.*

N. L. MINTZ, *Examiner.*

UNITED STATES PATENT OFFICE
CERTIFICATE OF CORRECTION

Patent No. 3,334,839                                                  August 8, 1967

Melvin G. Carlson

It is hereby certified that error appears in the above numbered patent requiring correction and that the said Letters Patent should read as corrected below.

Column 1, line 53, for "increases" read -- increase --; column 4, line 61, after "blocks" strike out "in"; column 5, line 2, after "will" insert -- be --; line 15, for "p.s.i., when" read -- p.s.i. When --; line 23, for "valve" read -- value --; line 40, after "and" insert -- the --; column 6, line 43, for "found" read -- wound --.

Signed and sealed this 16th day of July 1968.

(SEAL)
Attest:

Edward M. Fletcher, Jr.                                          EDWARD J. BRENNER
Attesting Officer                                                          Commissioner of Patents